United States Patent
Ying et al.

(10) Patent No.: US 6,992,852 B1
(45) Date of Patent: Jan. 31, 2006

(54) METHOD FOR REDUCING DISK THERMAL EXPANSION EFFECTS WHILE WRITING REFERENCE SPIRAL SERVO PATTERNS TO A DISK OF A DISK DRIVE

(75) Inventors: Wing Ying, Fremont, CA (US); William W. Clawson, Fremont, CA (US); Siri S. Weerasooriya, Campbell, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 0 days.

(21) Appl. No.: 10/966,542

(22) Filed: Oct. 15, 2004

(51) Int. Cl.
*G11B 21/02* (2006.01)

(52) U.S. Cl. .......................... 360/75; 360/31
(58) Field of Classification Search ............. None
See application file for complete search history.

(56) References Cited

U.S. PATENT DOCUMENTS

| | | | |
|---|---|---|---|
| 4,531,167 A | 7/1985 | Berger | |
| 4,812,929 A | 3/1989 | Stewart et al. | |
| 5,185,681 A * | 2/1993 | Volz et al. | 360/77.05 |
| 5,668,679 A | 9/1997 | Swearingen et al. | |
| 5,793,559 A | 8/1998 | Shepherd et al. | |
| 6,023,145 A | 2/2000 | Karaaslan et al. | |
| 6,061,200 A | 5/2000 | Shepherd et al. | |
| 6,091,564 A | 7/2000 | Codilian et al. | |
| 6,292,318 B1 | 9/2001 | Hayashi | |
| 6,304,407 B1 | 10/2001 | Baker et al. | |
| 6,429,995 B1 | 8/2002 | Dobbek et al. | |
| 6,469,859 B1 | 10/2002 | Chainer et al. | |
| 6,476,989 B1 | 11/2002 | Chainer et al. | |
| 6,507,450 B1 | 1/2003 | Elliott | |
| 6,519,107 B1 | 2/2003 | Ehrlich et al. | |
| 2005/0046993 A1 * | 3/2005 | Hanazawa et al. | 360/75 |

* cited by examiner

*Primary Examiner*—David Hudspeth
*Assistant Examiner*—Jason Olson
(74) *Attorney, Agent, or Firm*—Robroy R. Fawcett, Esq.

(57) ABSTRACT

A method is disclosed for reducing disk expansion effects while writing spiral reference patterns on a disk of a disk drive. The disk drive comprises control circuitry and a head disk assembly (HDA) for positioning a head radially over the disk. In the method, an external spiral servo writer is used to control a radial location of the head for writing a plurality of the spiral reference patterns between inner and outer seed tracks. A head velocity profile is adjusted for writing each spiral reference pattern to account for thermal disk expansion. The head internal to the disk drive is used to read the spiral reference patterns in order to write product servo bursts to the disk that define a plurality of radially-spaced circular data tracks.

15 Claims, 8 Drawing Sheets

METHOD FOR REDUCING DISK THERMAL EXPANSION EFFECTS WHILE WRITING REFERENCE SPIRAL SERVO PATTERNS TO A DISK OF A DISK DRIVE

BACKGROUND OF THE INVENTION

1. Field of the Invention

The present invention relates to disk drives for computer systems. More particularly, the present invention relates to accounting for thermal disk expansion during a process of writing spiral reference patterns to a disk of a disk drive.

2. Description of the Prior Art and Related Information

When manufacturing a disk drive, servo sectors $2_0$–$2_7$ are written to a disk 4 which define a plurality of radially-spaced, concentric data tracks 6 as shown in the prior art disk format of FIG. 1. Each servo sector (e.g., servo sector 24) comprises a preamble 108 for synchronizing gain control and timing recovery, a sync mark 110 for synchronizing to a data field 112 comprising coarse head positioning information such as a track number, and product servo bursts 114 which provide fine head positioning information. During normal operation the product servo bursts 114 are processed by the disk drive in order to maintain a head over a centerline of a target track while writing or reading data. In the past, external servo writers have been used to write the product servo bursts 114 to the disk surface during manufacturing. External servo writers employ extremely accurate head positioning mechanics, such as a laser interferometer, to ensure the product servo bursts 114 are written at the proper radial location from the outer diameter of the disk to the inner diameter of the disk. However, external servo writers are expensive and require a clean room environment so that a head positioning pin can be inserted into the head disk assembly (HDA) without contaminating the disk. Thus, external servo writers have become an expensive bottleneck in the disk drive manufacturing process.

The prior art has suggested various self servo writing methods wherein the internal electronics of the disk drive are used to write the product servo bursts independent of an external servo writer. For example, U.S. Pat. No. 5,668,679 teaches a disk drive which performs a self-servo writing operation by writing a plurality of spiral tracks to the disk which are then processed to write the product servo bursts along a circular path. The spiral tracks are written "open loop" by seeking the head from an outer diameter of the disk to an inner diameter of the disk. The disk drive calibrates acceleration/deceleration impulses to seek the head from the outer to inner diameter in a desired amount of time. Accurate radial positioning of the spiral tracks assumes the calibration process is accurate and that the calibrated acceleration/deceleration impulses will generate a repeatable response over multiple seeks. However, the calibration process will inevitably exhibit some degree of error and the dynamics of the disk drive will change between seeks inducing errors in the radial position of the spiral tracks. Dynamic errors which degrade the spiral tracks written during an open loop seek include vibration of the HDA, flutter and non-repeatable run-out of the disk and spindle bearings, stiction and non-repeatable run-out of the pivot bearings, windage on the head and arm, and flex circuit bias, windage, vibration, and temperature. Errors in writing the spiral tracks will propagate to the product servo bursts, thereby degrading the operating performance of the disk drive and reducing the manufacturing yield. Further, the '679 patent discloses to write the spiral tracks to the disk with a very steep slope over only one or two revolutions which reduces the accuracy of the head position error generated from the spiral tracks. Still further, each spiral track is written to the disk as a high frequency continuous signal (with missing bits), wherein the head position error is generated relative to time shifts in the detected location of the spiral tracks requiring a special timing recovery system as opposed to a conventional servo algorithm.

There is, therefore, a need to improve the servo writing process for a disk drive by reducing the bottleneck and expense of external servo writers while maintaining adequate operating performance and manufacturing yield.

SUMMARY OF THE INVENTION

The present invention may be embodied in a method for reducing disk thermal expansion effects while writing spiral reference patterns on a disk of a disk drive. The disk drive comprises control circuitry and a head disk assembly (HDA). The HDA comprises the disk, an actuator arm, a head connected to a distal end of the actuator arm, and a voice coil motor for rotating the actuator arm about a pivot to position the head radially over the disk. In the method, an external servo writer is used to control a radial location of the head for writing a plurality of the spiral reference patterns between an inner circular seed track at an inner radial location and an outer circular seed track at an outer radial location. Each spiral reference pattern is written based on a head velocity profile controlled by the external servo writer during writing of the respective spiral reference pattern. Thermal expansion of the disk during writing of the plurality of spiral reference patterns may increase a radial distance between the inner and outer circular seed tracks. The external servo writer adjusts the head velocity profile for writing each respective spiral reference pattern to account for thermal expansion of the disk. The head internal to the disk drive is used to read the spiral reference patterns in order to write product servo bursts to the disk.

In more detailed features of the invention, the head velocity profile may be adjusted by applying a scaling factor to the head velocity profile. The head velocity profile may be divided into a plurality of profile segments, and the head velocity profile may be adjusted by applying a segment scaling factor to each profile segment. The segment scaling factor for a profile segment for writing of the respective spiral reference pattern near the inner radial location may be greater than the segment scaling factor for a profile segment for writing of the respective spiral reference pattern near the outer radial location.

In other more detailed features of the invention, a head-positioning pin of the external servo writer may be inserted into the HDA for engaging the actuator arm before writing the spiral reference patterns. The control circuitry of the disk drive may be used to process the spiral reference patterns in order to write the product servo bursts to the disk during a self-servo writing operation. Alternatively, an external product servo writer may be used to process the spiral reference patterns in order to write the product servo bursts to the disk. The external servo writer may include an optical encoder for deriving the radial location of the head. Alternatively, the external servo writer may include a laser interferometer for deriving the radial location of the head. Each spiral reference pattern may be written from the outer radial location of the disk to the inner radial location of the disk. Alternatively, each spiral reference pattern may be written from the inner radial location of the disk to the outer radial location of the disk.

In additional more detailed features of the invention, the product servo bursts may be written in a substantially circular path. Also, the product servo bursts may form a plurality of servo wedges, and the number of spiral reference patterns may be twice the number of servo wedges. Further, each spiral reference pattern may include a plurality of reference servo bursts, each reference servo burst may include a plurality of high frequency transitions, and the reference servo bursts may be recorded at a periodic interval within each spiral reference pattern. The reference servo bursts may be substantially contiguous in the radial direction from an outer diameter of the disk to an inner diameter of the disk.

BRIEF DESCRIPTION OF THE DRAWINGS

The accompanying drawings illustrate embodiments of the present invention and, together with the description, serve to explain the principles of the invention.

DETAILED DESCRIPTION

Figure 1:
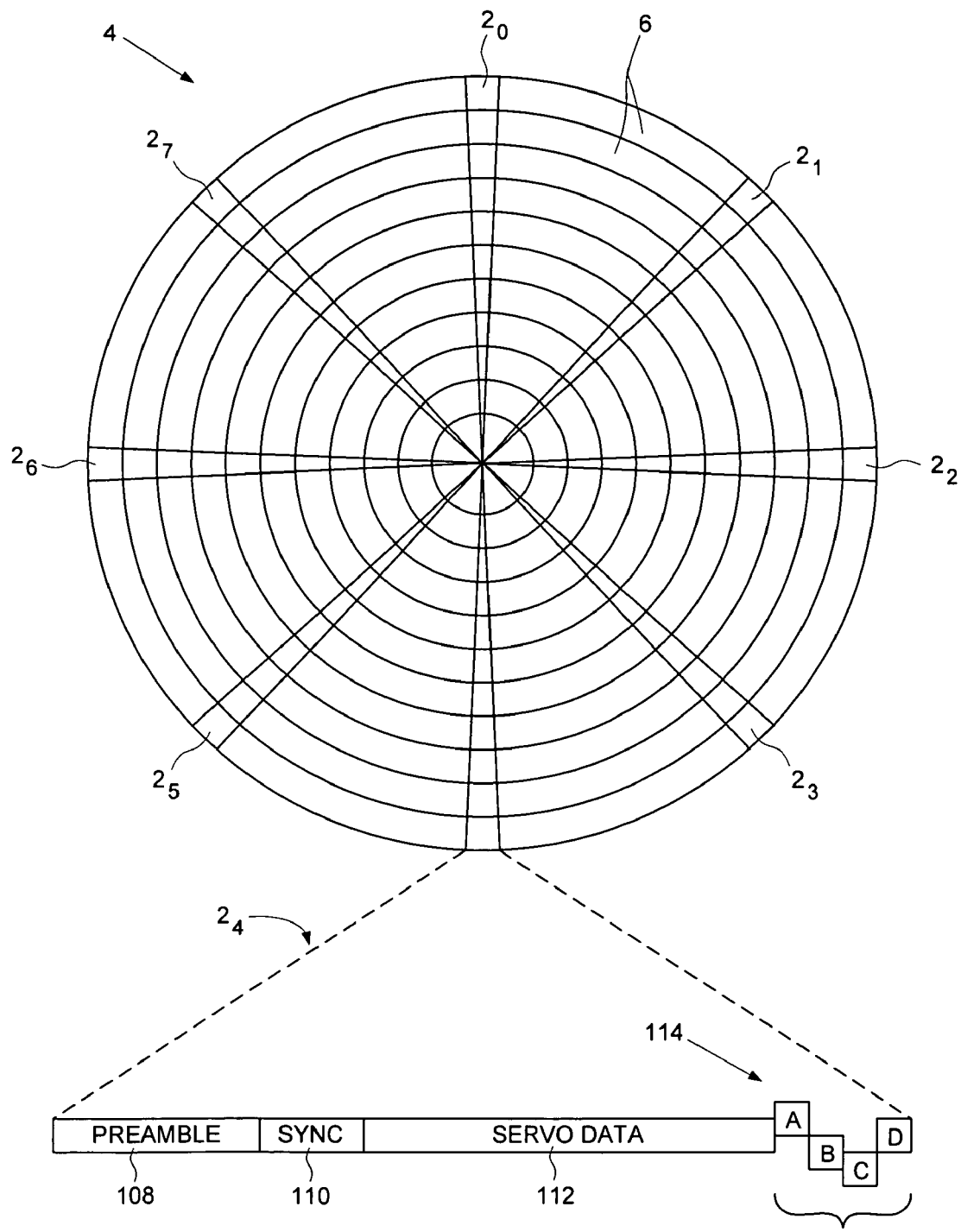
FIG. 1 shows a prior art format for a disk comprising a plurality of product servo bursts in servo sectors which define a plurality of radially spaced, concentric data tracks.
Figure 2:
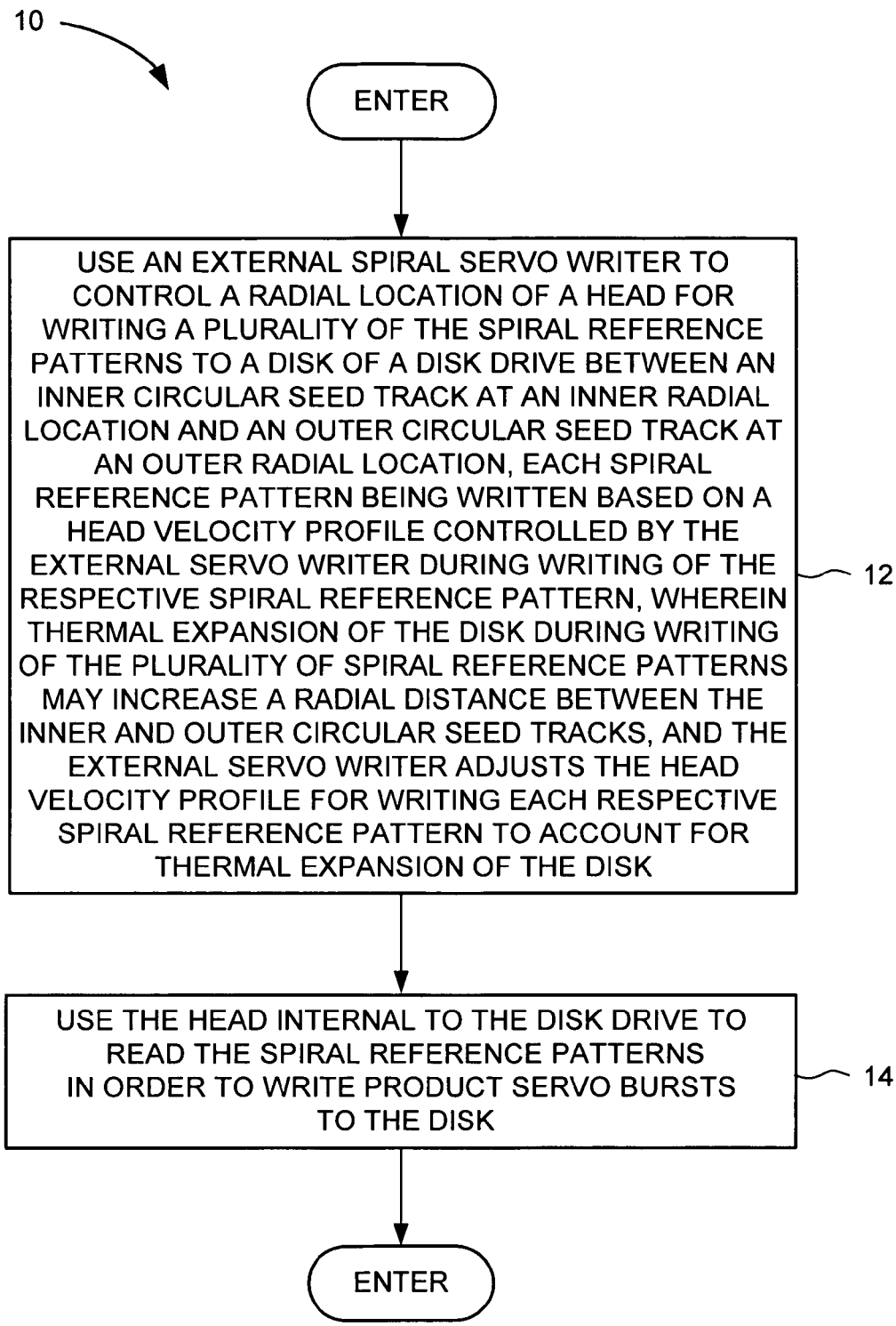
FIG. 2 shows a flow chart of a method for reducing disk expansion effects while writing spiral reference patterns to a disk of a disk drive, according to the present invention.
Figure 3A:
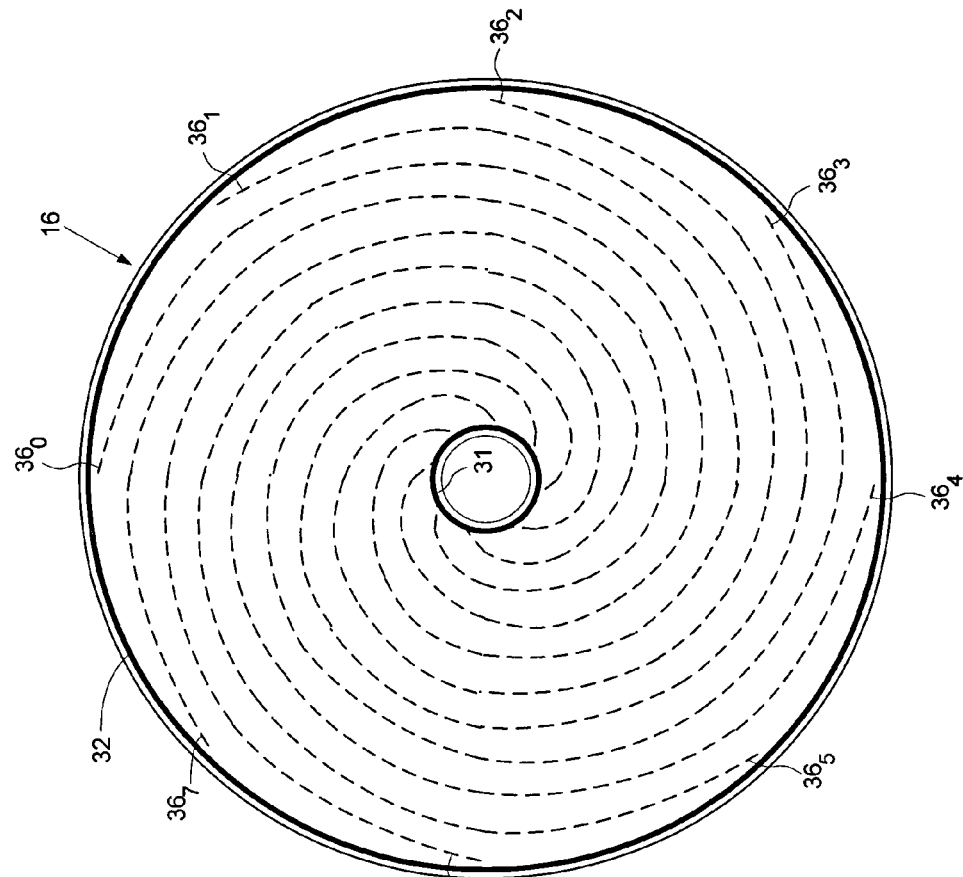
FIGS. 3A and 3B show an external spiral servo writer used to write a plurality of spiral reference patterns according to the method of FIG. 2.
Figure 6:
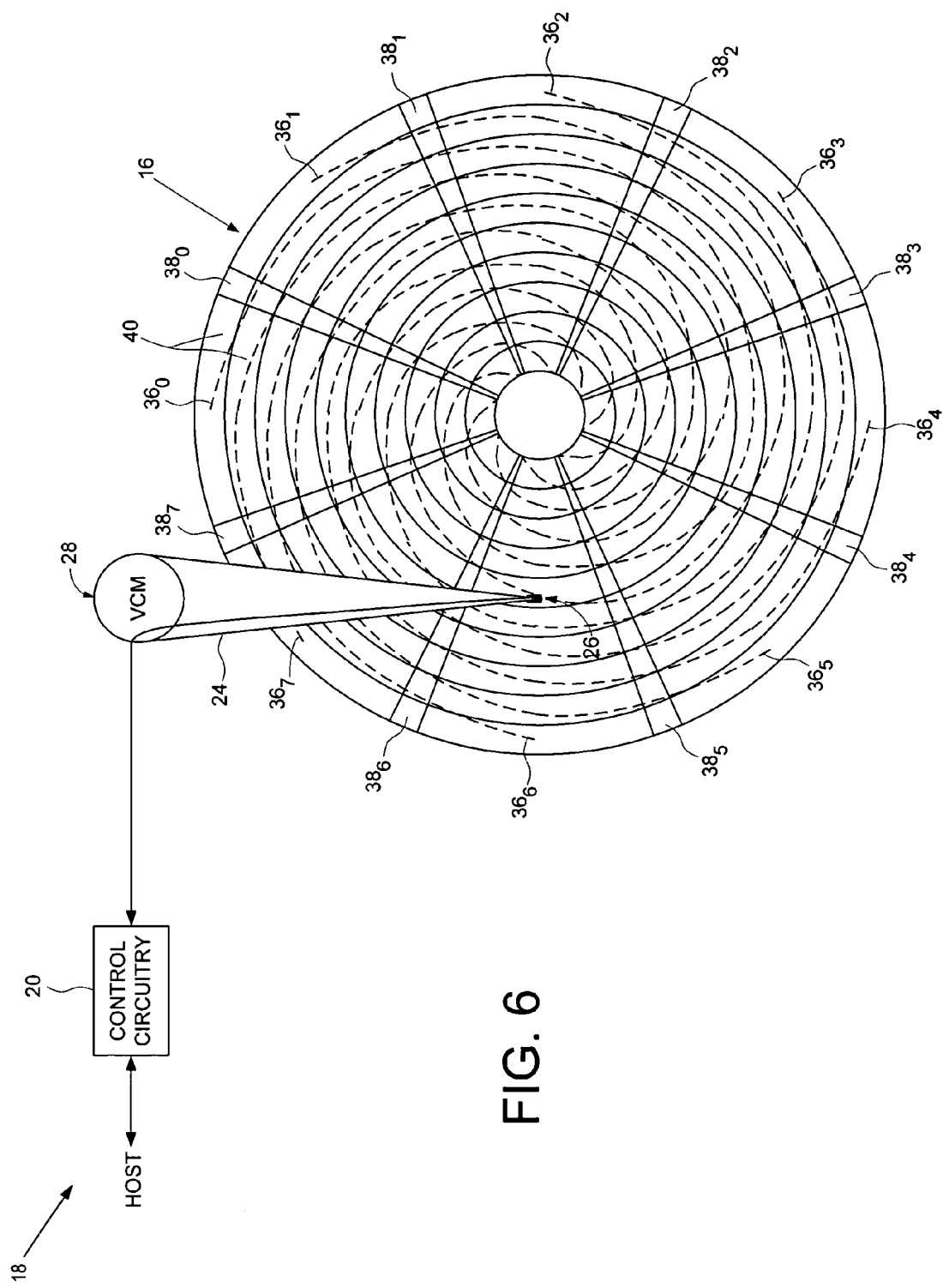
FIG. 6 shows a disk drive that processes the reference servo bursts in the spiral reference patterns to self-servo write product servo bursts to the disk.

With reference to FIGS. 2–6, the present invention may be embodied in a method 10 (FIG. 2) for reducing disk thermal expansion effects while writing spiral reference patterns $36_0$–$36_7$ (FIG. 3B) to a disk 16 of a disk drive 18 (FIG. 3A). The spiral reference patterns are used for forming product servo bursts $38_0$–$38_7$ (FIG. 6). The disk drive 18 comprises control circuitry 20 and a head disk assembly (HDA) 22. The HDA comprises the disk 16, an actuator arm 24, a head 26 connected to a distal end of the actuator arm 24, and a voice coil motor 28 for rotating the actuator arm 24 about a pivot to position the head 26 radially over the disk 16. In the method, an external spiral servo writer 30 is used to control a radial location of the head for writing a plurality of the spiral reference patterns between an inner circular seed 31 track at an inner radial location and an outer circular seed track 32 at an outer radial location. Each spiral reference pattern is written based on a head velocity profile 35 controlled by the external servo writer during writing of the respective spiral reference pattern. Thermal expansion of the disk during writing of the plurality of spiral reference patterns may increase a radial distance between the inner and outer circular seed tracks. The external servo writer adjusts the head velocity profile for writing each respective spiral reference pattern to account for thermal expansion of the disk (step 12). The head internal to the disk drive is used to read the spiral reference patterns in order to write the product servo bursts to the disk (step 14). The product servo bursts are written in a substantially circular path for defining a plurality of radially spaced, concentric data tracks 40.

During the process of the writing the spiral reference patterns $36_0$–$36_7$, a spindle motor (not shown) may generate heat that is conducted to the disk 16. The heat causes thermal expansion of the disk. This thermal expansion can be on the order of several data tracks 40 so that, without adjustment, a last written spiral reference pattern may have a different profile or slope from a first written spiral reference pattern causing an abrupt discontinuity that may interfere with circular track following desired for writing the product servo bursts $38_0$–$38_7$. The techniques of the present invention attempt to avoid an abrupt discontinuity in the slopes of first and last written spiral reference patterns by adjusting the head velocity profile as the disk heats up and thermally expands during the process of writing the spiral reference patterns.

Each spiral reference pattern $36_i$ may be written from the outer radial location of the disk 16 to the inner radial location of the disk 16, or from the inner radial location of the disk 16 to the outer radial location of the disk 16. The product servo bursts $38_0$–$38_7$ may form a plurality of servo wedges and, advantageously, the number of spiral reference patterns may be twice the number of servo wedges.

Figure 3B:
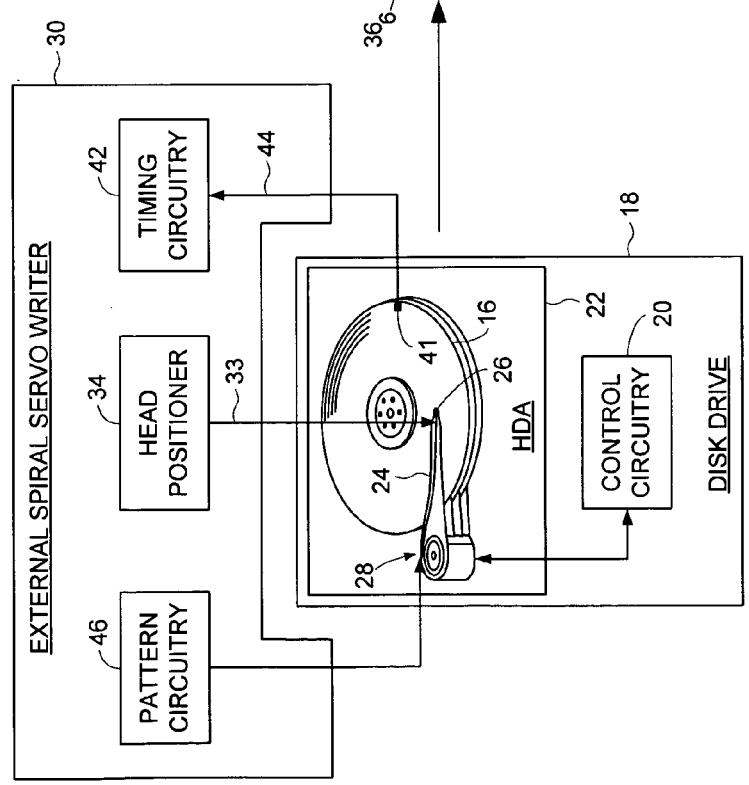

A head positioning pin 33 of an external spiral servo writer 30 may be inserted into the HDA 22 before writing the spiral reference patterns, the head positioning pin 33 for engaging the actuator arm 24. The external spiral servo writer 30 comprises head positioning mechanics 34 used to derive a radial location of the head 26. The head positioning pin 33 is actuated in response to the radial location of the head 26 in a closed loop system in order to position the head 26 radially over the disk 16 while writing a plurality of reference servo bursts to the disk along a plurality of substantially spiral paths to form the plurality of spiral reference patterns $36_0$–$36_7$ as illustrated in FIG. 3B.

Figure 4:
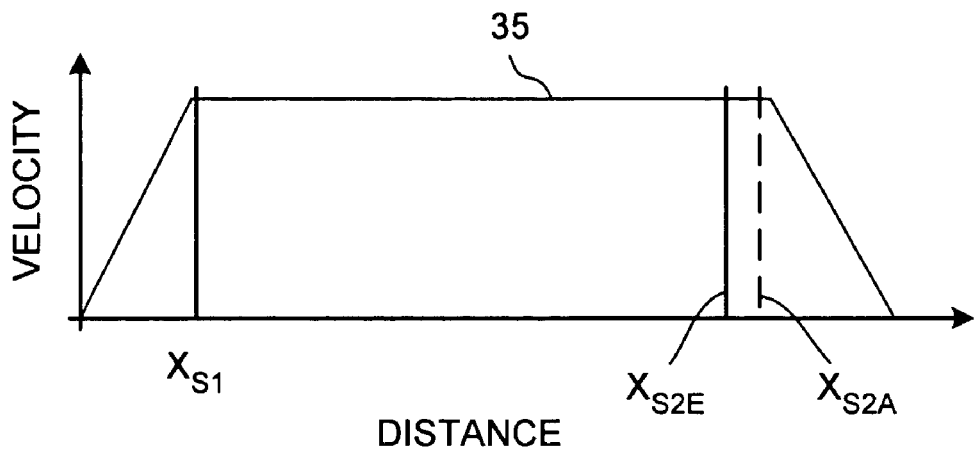
FIG. 4 shows a simplified head velocity profile that is adjusted for writing the spiral reference patterns to account for disk expansion effects, according to the present invention.
Figure 5:
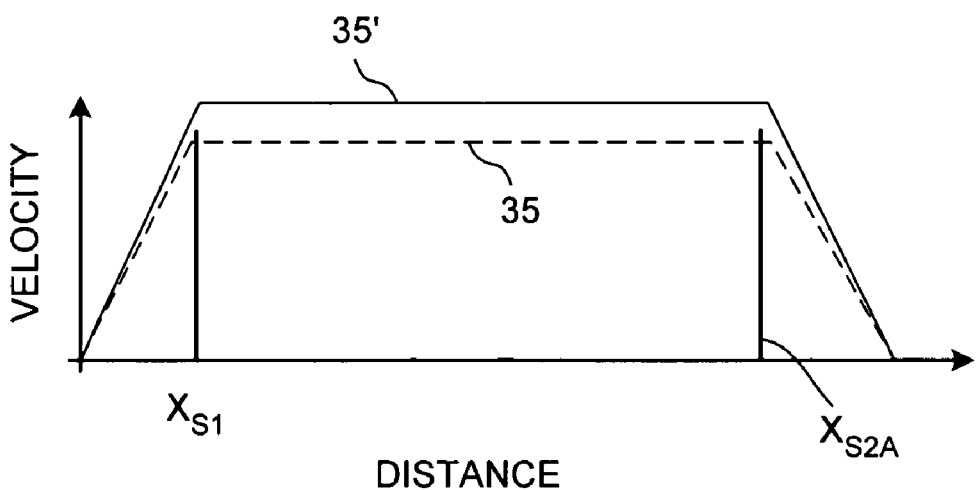
FIG. 5 shows an adjusted head velocity profile for reducing disk expansion effects while writing spiral reference patterns to the disk, according to the present invention

A simplified base head velocity profile 35 is shown in FIG. 4. The head velocity profile has an initial acceleration segment during which an acceleration current is applied to the head positioning mechanics 34 for rotating the actuator arm 24 about the pivot to move the head 26 over the disk 16. The head reaches a relatively constant spiral write velocity before the head encounters the outer circular seed track 32 at a location $X_{S1}$ (assuming the spiral reference pattern $36_i$ is being written from the outer radial location to the inner radial location of the disk 16). Advantageously, the head positioning mechanics has an optical encoder that provides a location measurement when the head encounters either of the outer or inner circular seed tracks. After encountering the outer circular seed track, the head begins writing the spiral reference pattern. Just after the end of the spiral reference pattern is written, the head will encounter the inner circular seed track 31. After the head encounters the inner seed track, a reverse current is applied to the head positioning mechanism to stop the rotation of the actuator arm. Before the disk heats up, the base spiral write velocity provides the desired shape for the spiral reference pattern. Thus, the inner seed track should be at an expected location $X_{S2E}$. However, during the spiral write process, thermal expansion of the disk may occur and increase the radial distance between the outer circular seed track and the inner circular seed track. As a result, the head, traveling at the base spiral write velocity, will not encounter the inner circular seed track until an actual write location $X_{S2A}$, and the shape for the spiral reference pattern will be increasing distorted from the desired shape. Adjusting the head velocity profile can account for the thermal disk expansion and maintain the desired shape of the spiral reference patterns. The adjusted head velocity profile 35' may be obtained by applying a scaling factor to the base head velocity profile 35. The scaling factor for a next spiral reference pattern may be calculated using the distance between the inner and outer circular seed tracks measured during writing of the last spiral reference pattern. The scaling factor may be applied by increasing the initial acceleration current applied to the head positioning mechanics 34 in proportion to the scaling factor to obtain an increased spiral write velocity.

After the spiral reference patterns are written to the disk 16, the head positioning pin 33 is removed from the HDA 22 and the head 26 internal to the disk drive 18 is used to read the reference servo bursts in the spiral reference patterns $36_0$–$36_7$ in order to write the product servo bursts $38_0$–$38_7$ to the disk 16 (FIG. 6), thereby defining the plurality of radially spaced, concentric data tracks 40.

As shown in FIG. 6, the control circuitry 20 of the disk drive 18 may be used to read the reference servo bursts in the spiral reference patterns $36_0$–$36_7$ in order to write the product servo bursts $38_0$–$38_7$ to the disk 16 during a self-servo writing operation. With reference to FIG. 6, an external product servo writer 50 may be used to read the reference servo bursts in the spiral reference patterns $36_0$–$36_7$ in order to write the product servo bursts $38_0$–$38_7$ to the disk 16. The embodiment of FIG. 3A shows the entire disk drive 18 inserted into the external spiral servo writer 30 while writing the spiral reference patterns $36_0$–$36_7$ to the disk 16. In another embodiment, only the HDA 22 may be inserted into the external spiral servo writer 30, wherein a printed circuit board assembly (PCBA) comprising the control circuitry 20 is mounted to the HDA 22 after the external servo writer 30 writes the spiral reference patterns $36_0$–$36_7$ to the disk 16.

The head positioning pin 33 may be connected to the actuator arm 24 by applying a small amount of current to the voice coil motor 28 in order to bias the actuator arm 24 against the head positioning pin 33. In one embodiment, the head positioning mechanics 34 may include a laser interferometer for generating the radial location of the head 26. Alternatively, the head positioning mechanics may include an optical encoder. However, any suitable device for generating the radial location of the head 26 may be employed. In the embodiment of FIG. 3A, the external servo writer 30 comprises a clock head 41 which is also inserted into the HDA 22 for reading a clock track recorded on an outer diameter of the disk 16. Timing circuitry 42 within the external servo writer 30 processes the signal 44 from the clock head 41 in order to write the reference servo bursts at the appropriate circumferential location. Pattern circuitry 46 within the external servo writer 30 generates the reference servo burst pattern applied to the head 26 at the appropriate time.

The number of spiral reference patterns $36_0$–$36_N$ as well as the slope of each spiral reference pattern $36_i$ may be selected so that the external spiral servo writer 30 can process the disk drive 18 in a significantly shorter time period as compared to writing a complete set of product servo bursts $38_0$–$38_7$ to the disk 16. This increases the throughput of the external spiral servo writer 30 by having the disk drives self-servo write the product servo bursts $38_0$–$38_7$ using the spiral reference patterns $36_0$–$36_7$ while avoiding errors inherent in having the disk drive write the spiral reference patterns $36_0$–$36_7$.

The product servo bursts $38_0$–$38_N$ are written along a substantially circular path while tracking the spiral reference patterns $36_0$–$36_N$. The product servo bursts $38_0$–$38_7$ form a plurality of servo wedges which extend from servo sector to servo sector. The control circuitry 20 of FIG. 6 computes a position error for the head 26 with respect to a circular trajectory in response to the reference servo bursts. Because the reference servo bursts are similar in composition to the product servo bursts (high frequency transitions recorded at a periodic interval) and because the reference servo bursts are substantially contiguous in the radial direction, a conventional servo algorithm may be employed to compute the head position error (e.g., an algorithm similar to that used to compute the head position error from the product servo bursts $38_0$–$38_N$ during normal operation of the disk drive). The head position error is input to a servo control system which generates the appropriate control signal applied to the voice coil motor 28. The algorithm for computing the head position error is continuously updated relative to the circumferential location of the head 26 to account for the spiral trajectory of the reference servo bursts in the spiral reference patterns $36_0$–$36_N$. In one embodiment, a timing clock is generated in response to the reference servo bursts, wherein the timing clock is used to write the product servo bursts $38_0$–$38_N$ at the appropriate circumferential location on the disk 16. In another embodiment, the external spiral servo writer 30 writes a periodic clock signal together with the spiral reference patterns $36_0$–$36_N$, wherein the periodic clock signal is processed in order to generate the timing clock used to write the product servo bursts $38_0$–$38_N$ at the appropriate circumferential location on the disk 16.

Figure 7:
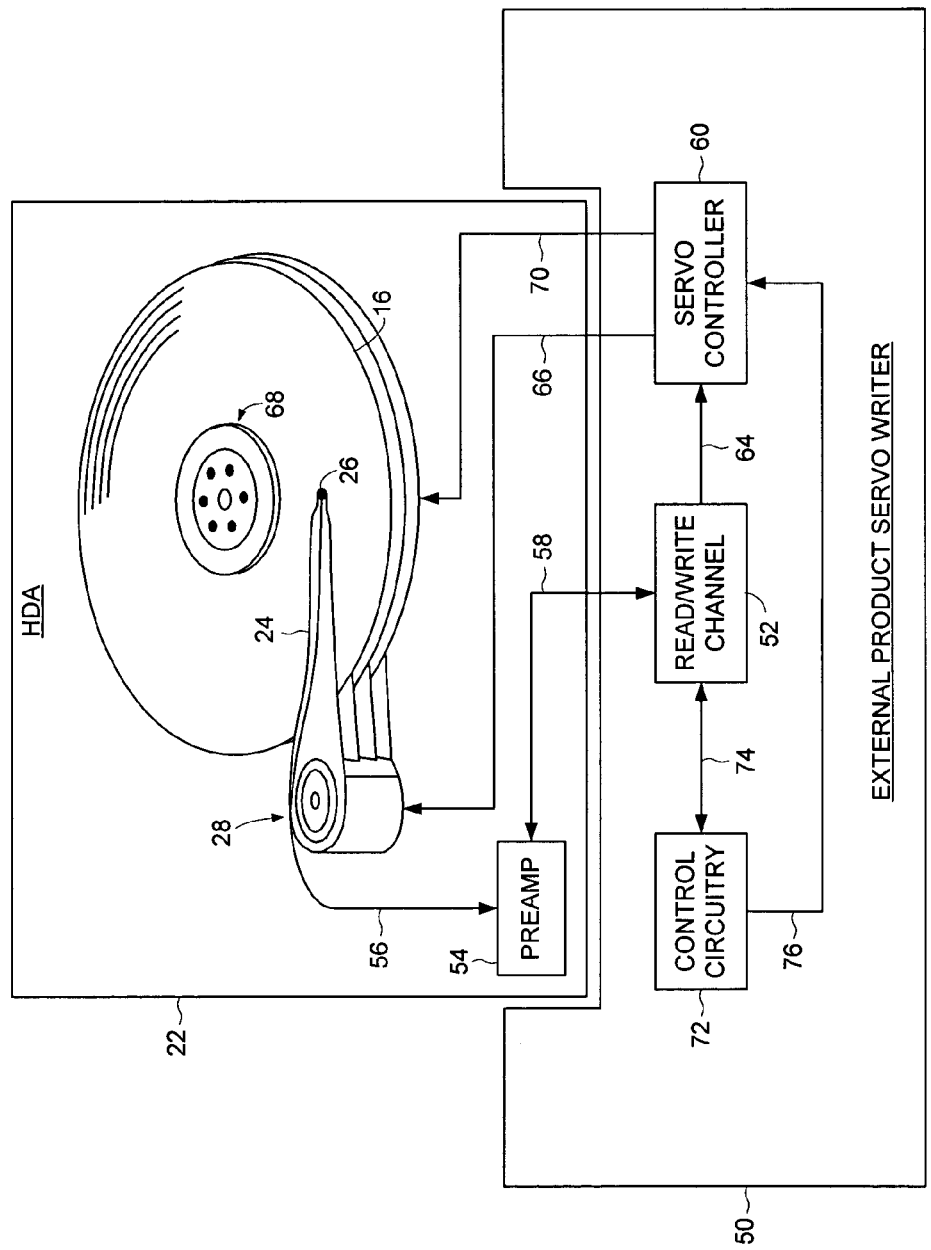
FIG. 7 shows an embodiment of the present invention wherein an external product servo writer is used to read the reference servo bursts in the spiral reference patterns in order to write the product servo bursts to the disk.

FIG. 7 shows an embodiment of the present invention wherein after writing the spiral reference patterns $36_0$–$36_N$ to the disk 16 (FIGS. 3A–3B), the HDA 22 is inserted into an external product servo writer 50 comprising suitable circuitry for reading and processing the spiral reference patterns $36_0$–$36_N$ in order to write the product servo bursts $38_0$–$38_N$ to the disk 16. The external product servo writer 50 comprises a read/write channel 52 for interfacing with a preamp 54 in the HDA 22. The preamp 54 amplifies a read signal emanating from the head 26 over line 56 to generate an amplified read signal applied to the read/write channel 52 over line 58. The read/write channel 52 comprises suitable circuitry/software for measuring the reference servo bursts (e.g., integration circuitry/software) and for transmitting a signal representing the reference servo bursts to a servo controller 60 over line 64. The servo controller 60 processes the reference servo burst signals to generate a head position error. The head position error is used to generate a VCM control signal applied to the VCM 28 over line 66 in order to maintain the head 26 along a circular trajectory. The servo controller 60 also generates a spindle motor control signal applied to a spindle motor 68 over line 70 to maintain the disk 16 at a desired angular velocity. Control circuitry 72 processes information received from the read/write channel 52 over line 74 associated with the reference servo bursts (e.g., timing information) and provides the product servo burst patterns to the read/write channel 52 at the appropriate time. The product servo bursts patterns are provided to the preamp 54 which modulates a current in the head 26 in order to write the product servo bursts $38_0$–$38_N$ to the disk 16. The control circuitry 72 also transmits control information over line 76 to the servo controller 60, such as the target servo track to be written. After writing the product servo bursts $38_0$–$38_N$ to the disk 16, the HDA 22 is removed from the external product servo writer 50 and a printed circuit board assembly (PCBA) comprising the control circuitry 20 (FIG. 3A) is mounted to the HDA 22.

Figure 8:
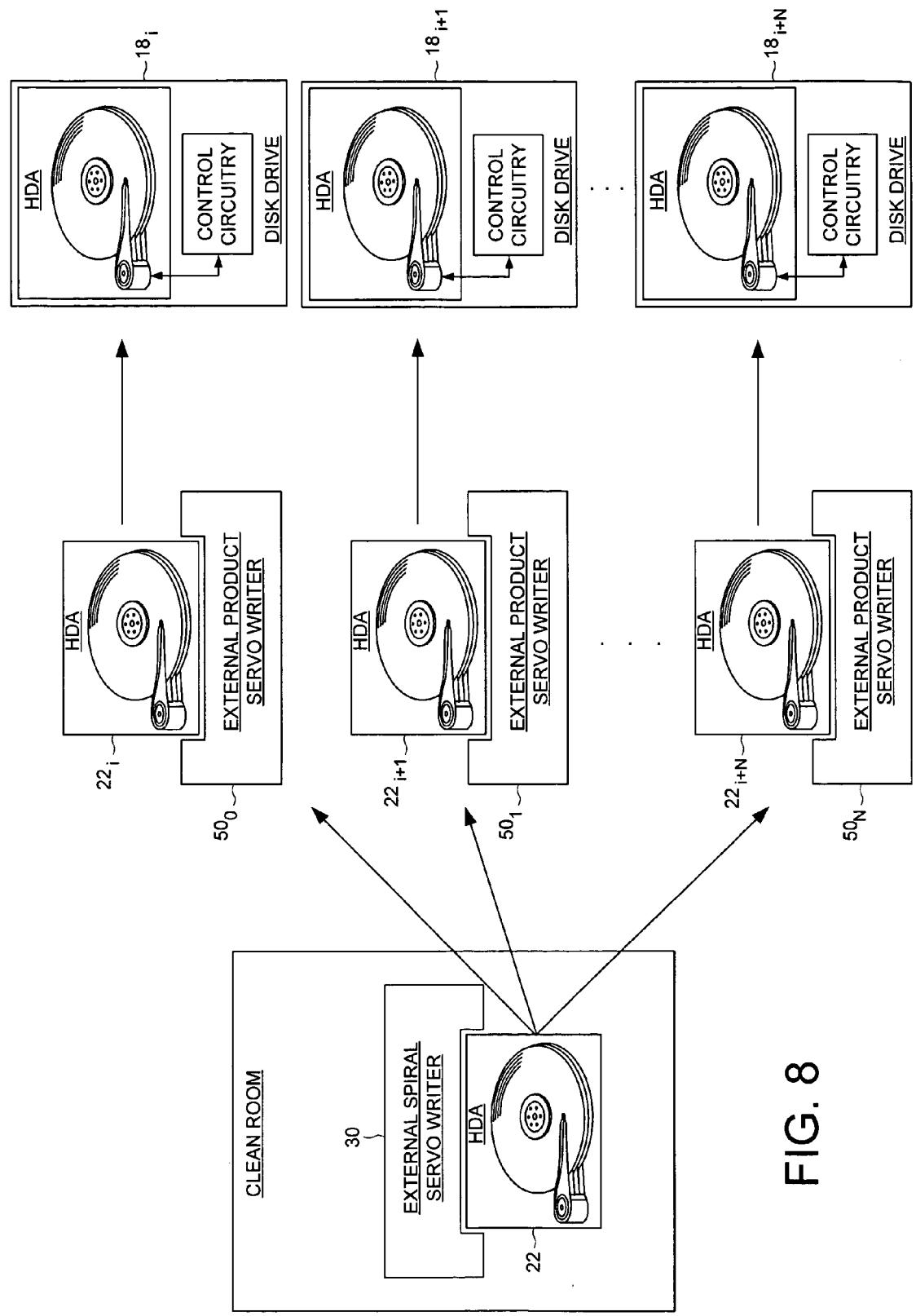
FIG. 8 shows an embodiment of the present invention wherein a plurality of external product servo writers process the HDAs output by an external spiral servo writer.

In one embodiment, the external product servo writer 50 of FIG. 7 interfaces with the HDA 22 over the same connections as the control circuitry 20 to minimize the modifications needed to facilitate the external product servo writer 50. The external product servo writer 50 is less expensive than a conventional servo writer because it does not require a clean room or sophisticated head positioning mechanics. In an embodiment shown in FIG. 8, a plurality of external product servo writers $50_0$–$50_N$ process the HDAs $22_{i-i+N}$ output by an external spiral servo writer 30 in order to write the product servo bursts less expensively and more efficiently than a conventional servo writer. This embodiment may provide a further reduction in cost since the circuitry and software for processing the reference servo bursts in order to write the product servo bursts are implemented in the external product servo writer 50 and not replicated in each disk drive as in the embodiment of FIG. 6. Further information related to the process for writing the product servo bursts is included in U.S. application Ser. No. 10/112,282, filed Mar. 29, 2002, and titled USING AN EXTERNAL SPIRAL SERVO WRITER TO WRITE SPIRAL REFERENCE PATTERNS TO A DISK TO FACILITATE WRITING PRODUCT SERVO BURSTS TO THE DISK, which application is incorporated herein in its entirety by reference.

Figure 9:
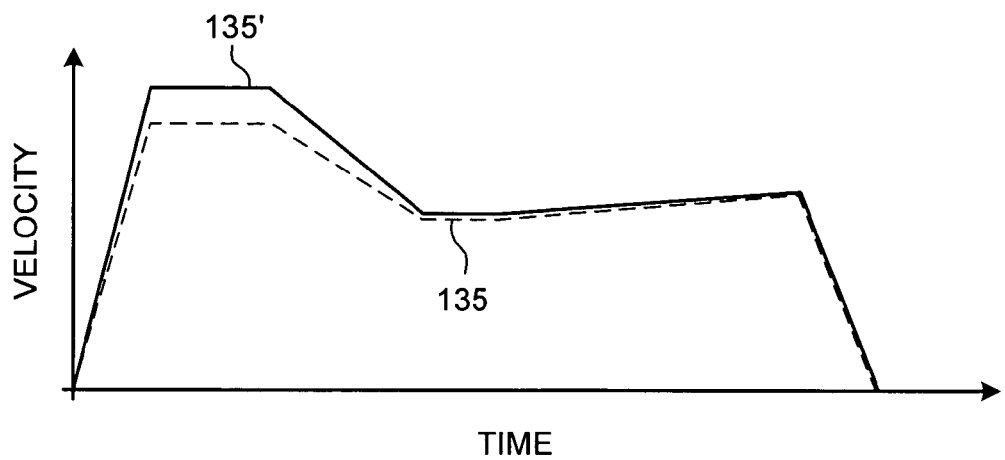
FIG. 9 shows a head velocity profile having a plurality of profile segments, according to the present invention.

With reference to FIG. 9, the base head velocity profile 135 may be divided into a plurality of profile segments, and the adjusted head velocity profile 135' may be obtained by applying a segment scaling factor to each profile segment. Because the spindle motor may be a substantial source of heat causing the thermal disk expansion, the thermal expansion at the center of the disk 16 may be greater than the thermal expansion at an outer edge of the disk. As a result, the segment scaling factor for a profile segment for writing of the respective spiral reference pattern near the inner radial location may be greater than the segment scaling factor for a profile segment for writing of the respective spiral reference pattern near the outer radial location.

What is claimed is:

1. A method for reducing disk thermal expansion effects while writing spiral reference patterns on a disk of a disk drive, the disk drive comprising control circuitry and a head disk assembly (HDA) comprising the disk, an actuator arm, a head connected to a distal end of the actuator arm, and a voice coil motor for rotating the actuator arm about a pivot to position the head radially over the disk, the method comprising:

using an external servo writer to control a radial location of the head for writing a plurality of the spiral reference patterns between an inner circular seed track at an inner radial location and an outer circular seed track at an outer radial location, each spiral reference pattern being written based on a head velocity profile controlled by the external servo writer during writing of the respective spiral reference pattern, wherein thermal expansion of the disk during writing of the plurality of spiral reference patterns may increase a radial distance between the inner and outer circular seed tracks, and the external servo writer adjusts the head velocity profile for writing each respective spiral reference pattern to account for thermal expansion of the disk; and using the head internal to the disk drive to read the spiral reference patterns in order to write product servo bursts to the disk.

2. The method as recited in claim 1, wherein the head velocity profile is adjusted by applying a scaling factor to the head velocity profile.

3. The method as recited in claim 1, wherein the head velocity profile is divided into a plurality of profile segments, and the head velocity profile is adjusted by applying a segment scaling factor to each profile segment.

4. The method as recited in claim 3, wherein the segment scaling factor for a profile segment for writing of the respective spiral reference pattern near the inner radial location is greater than the segment scaling factor for a profile segment for writing of the respective spiral reference pattern near the outer radial location.

5. The method as recited in claim 1, further comprising inserting a head-positioning pin of the external servo writer into the HDA before writing the spiral reference patterns, the head positioning pin for engaging the actuator arm.

6. The method as recited in claim 1, wherein the control circuitry of the disk drive is used to process the spiral reference patterns in order to write the product servo bursts to the disk during a self-servo writing operation.

7. The method as recited in claim 1, wherein an external product servo writer is used to process the spiral reference patterns in order to write the product servo bursts to the disk.

8. The method as recited in claim 1, wherein the external servo writer comprises an optical encoder for deriving the radial location of the head.

9. The method as recited in claim 1, wherein the external servo writer comprises a laser interferometer for deriving the radial location of the head.

10. The method as recited in claim 1, wherein each spiral reference pattern is written from the outer radial location of the disk to the inner radial location of the disk.

11. The method as recited in claim 1, wherein each spiral reference pattern is written from the inner radial location of the disk to the outer radial location of the disk.

12. The method as recited in claim 1, wherein the product servo bursts are written in a substantially circular path.

13. The method as recited in claim 1, wherein:
   the product servo bursts form a plurality of servo wedges; and
   the number of spiral reference patterns is twice the number of servo wedges.

14. The method as recited in claim 1, wherein:
   each spiral reference pattern comprises a plurality of reference servo bursts;
   each reference servo burst comprises a plurality of high frequency transitions; and
   the reference servo bursts are recorded at a periodic interval within each spiral reference pattern.

15. The method as recited in claim 14, wherein the reference servo bursts are substantially contiguous in the radial direction from an outer diameter of the disk to an inner diameter of the disk.

* * * * *